United States Patent
Vallon et al.

(10) Patent No.: US 7,314,211 B2
(45) Date of Patent: Jan. 1, 2008

(54) CONNECTOR FOR A COMPRESSED-GAS CANNISTER AND A FASTENING APPLIANCE

(75) Inventors: Emmanuel Vallon, Portes les Valence (FR); Patrick Herelier, Tournon (FR)

(73) Assignee: Societe de Prospection et d'Inventions Techniques SPIT, Bourg les Valence (FR)

( * ) Notice: Subject to any disclaimer, the term of this patent is extended or adjusted under 35 U.S.C. 154(b) by 0 days.

(21) Appl. No.: 11/419,147

(22) Filed: May 18, 2006

(65) Prior Publication Data

US 2006/0197290 A1    Sep. 7, 2006

Related U.S. Application Data

(63) Continuation of application No. 10/316,835, filed on Dec. 12, 2002, now abandoned.

(30) Foreign Application Priority Data

Dec. 18, 2001    (FR) .................................. 01 16370

(51) Int. Cl.
   *F16K 21/00* (2006.01)
(52) U.S. Cl. ............ 251/321; 137/614.19; 137/614.11; 251/319
(58) Field of Classification Search ........... 137/614.19, 137/614.11; 251/319, 320, 321
   See application file for complete search history.

(56) References Cited

U.S. PATENT DOCUMENTS

| | | |
|---|---|---|
| 2,661,964 A | 12/1953 | Mann |
| 2,773,521 A | 12/1956 | Leonard |
| 3,216,628 A | 11/1965 | Fergusson |
| 3,266,533 A | 8/1966 | McHale |
| 3,595,279 A | 7/1971 | Jaffe |
| 3,620,267 A | 11/1971 | Seablom |
| 3,877,499 A | 4/1975 | Fluster |
| 3,945,617 A | 3/1976 | Callery |
| 3,977,575 A | 8/1976 | Macquire-Cooper |
| 4,305,528 A | 12/1981 | Craig |
| 4,484,769 A | 11/1984 | Lacey |
| 4,625,780 A | 12/1986 | Burnham |

(Continued)

FOREIGN PATENT DOCUMENTS

EP    0922902    6/1999

(Continued)

*Primary Examiner*—Kevin Lee
(74) *Attorney, Agent, or Firm*—Lowe, Hauptman, Ham & Berner, LLP

(57) ABSTRACT

A connection arrangement for transferring gas from a compressed gas cartridge, has a valve element configured to control the release of gas from the cartridge; a male outlet which is integral with the valve element; a male inlet of a gas receiver for a tool that runs on compressed gas; and a connector receiving and connecting the male inlet and outlet. The connector is a tubular housing having a through hole extending from one end to the other. An inner wall of the housing contacts side surfaces of the male outlet and inlet in a sealing manner. The connector also has, in a middle region, transverse sealing surfaces that contact the end faces of the male outlet and inlet. The diameter of the through hole in this middle region is the same as the inner diameters of the openings in the ends of the male inlet and outlet.

23 Claims, 3 Drawing Sheets

U.S. PATENT DOCUMENTS

| | | |
|---|---|---|
| 4,803,053 A | 2/1989 | Williamson |
| 5,125,848 A | 6/1992 | Zimmerly |
| 5,127,436 A * | 7/1992 | Campion et al. ...... 137/614.11 |
| 5,490,545 A | 2/1996 | Sokoloff et al. |
| 5,558,371 A | 9/1996 | Lordo |
| 5,642,763 A | 7/1997 | Kurtz |
| 5,851,036 A | 12/1998 | Vanesky |
| 6,230,737 B1 * | 5/2001 | Notaro et al. ............ 137/329.4 |
| 6,457,899 B1 | 10/2002 | Lin |
| 6,523,860 B1 | 2/2003 | Shkolnikov et al. |
| 6,656,163 B1 | 12/2003 | Marshall et al. |
| 6,901,962 B2 * | 6/2005 | Kroupa et al. ......... 137/630.14 |

FOREIGN PATENT DOCUMENTS

| | | |
|---|---|---|
| EP | 1197299 | 4/2002 |
| GB | 1033689 | 6/1966 |
| GB | 2211506 A | 7/1989 |

* cited by examiner

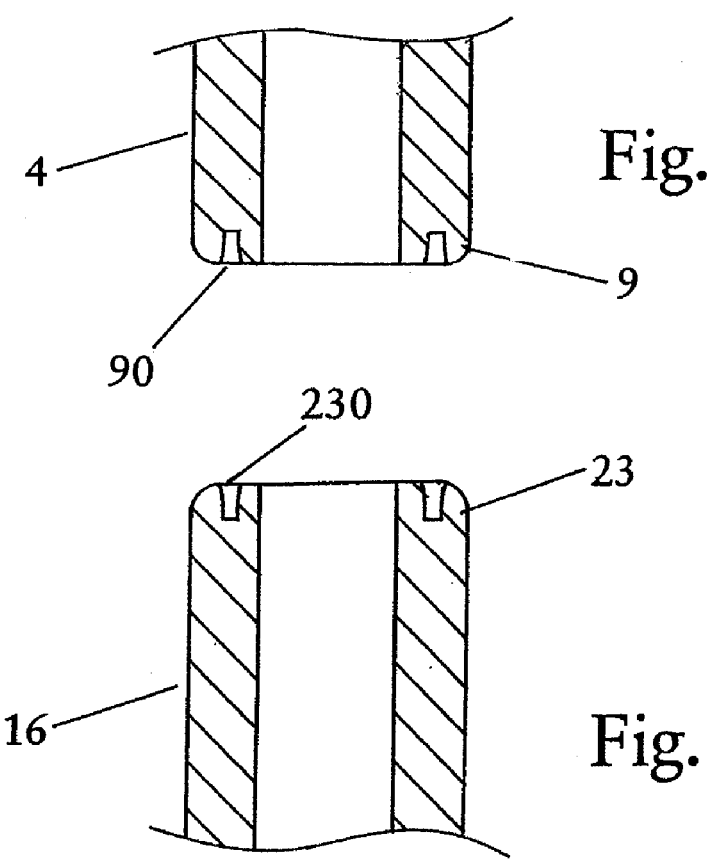

CONNECTOR FOR A COMPRESSED-GAS CANNISTER AND A FASTENING APPLIANCE

CROSS-REFERENCE TO RELATED APPLICATIONS

This is a continuation application that claims priority to U.S. patent application Ser. No. 10/316,835, filed on Dec. 12, 2002, now abandoned, in the name of Emmanuel VALLON et al. which claims priority to French Patent Application No. 01 16 370 filed on Dec. 18, 2003. The content of these two patent applications is hereby incorporated by reference in its entirety.

BACKGROUND OF THE INVENTION

1) Field of the Invention

The invention relates to a connector for, on the one hand, a male ejection end-piece of a compressed-gas canister intended to supply compressed gas to a fastening appliance that runs on compressed gas and, on the other hand, a male inlet end-piece of a device for letting compressed gas into the appliance, comprising sealing means designed to accommodate the two male end-pieces and intended to seal the connection between the two end-pieces along cylindrical sealing surface portions extending on each side of the ends of the two male end-pieces.

2) Description of the Related Art

A "fastening appliance" is to be understood as meaning an appliance for driving fasteners such as nails.

FR-2 771 796 teaches such a connector. More specifically, with this connector, in operation, the ends of two male end-pieces are butted one against the other in a plane where they meet, a sealing sleeve extending on each side of this meeting plane and surrounding the ends of the two male end-pieces with, in the sleeve, an internal groove for retaining leakage gas, extending between cylindrical surface portions. These sealing surface portions may prove insufficient. Furthermore, the butting-together, via the ends of their end-pieces, of the canister and of the inlet solenoid of the fastening appliance, may be the cause of a certain amount of wear on the solenoid.

SUMMARY OF THE INVENTION

The present invention aims to perfect the connector of the prior art.

To this end, the invention relates to a connector of the type mentioned hereinabove, characterized in that the sealing means are designed also to offer sealing surface portions extending more or less at right angles to the axis of the cylindrical sealing surface portions.

By virtue of the invention, the male end-pieces can no longer be butted together directly, but via sealing means that may be qualified as radial.

In an advantageous embodiment of the connector of the invention, there is an annular and transverse seal intended to be housed in two grooves formed in the end surfaces of the two male end-pieces.

However, as a preference, the sealing means comprise a double female sleeve for accommodating the two male end-pieces, with an annular and transverse sealing partition in the middle intended to be interposed between the two end-pieces.

BRIEF DESCRIPTION OF THE DRAWINGS

The invention will be better understood with the aid of the following description of the connector, with reference to the appended drawing in which:

FIGS. 5a and 5b are cross sectional views showing the grooves formed in the end surfaces of the male end pieces

DETAILED DESCRIPTION OF THE PREFERRED EMBODIMENTS

Figure 4:
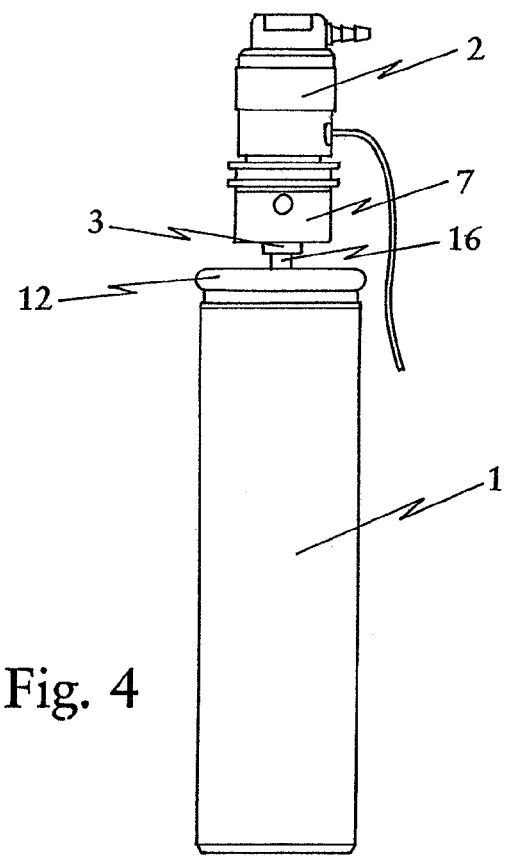
FIG. 4 is an overall view of the solenoid mounted on the canister.

With reference to FIG. 4, a compressed-gas canister 1 is mounted on the compressed-gas inlet solenoid 2 of an appliance for driving fasteners, of the nail type, via a sealing connector 3.

The inlet solenoid 2 comprises a male inlet end-piece 4 extending axially—along the axis 8—projecting from the bottom 5 of a bowl 6, formed by an annular skirt 7 for accommodating the connector 3. The end 9 of the inlet end-piece 4 of the solenoid is set back from the annular edge 10 of the skirt 7. The compressed-gas canister 1 comprises a cylindrical casing 11 ending in an annular bulge 12 forming a bowl 13 from the centre of which an ejection base 14 projects, this base nonetheless being set back from the annular edge 15 of the bulge 12.

An ejection end-piece 16 is mounted in the ejection base 14, to slide against the action of a return spring 17. The end-piece 16 comprises an external tubular part 18 projecting from the ejection base 14 and extended by an internal solid part 19 acting as a valve. The valve 19 is mounted to slide in a cylinder 20. The return spring 17 is housed inside the cylinder 20, around the valve part 19 of the ejection end-piece 16, bearing against an annular rim 21 of the valve 19 of a diameter roughly equal to that of the cylinder 20 but nonetheless very slightly smaller so that compressed gas can escape between the cylinder 20 and this rim 21. At rest, the rim 21 of the valve 19 bears against an annular seal 22 housed in an annular shoulder of the cylinder 20.

The connector 3, in section, has an H shape and thus comprises two female sleeves 31, 32, open in opposite directions, separated by an annular and transverse end partition 33 which is located in the middle of the connector.

The sleeve 31 is intended to accommodate the inlet end-piece 4 of the solenoid 2 of the appliance, and the sleeve 32 is intended to receive the ejection end-piece 16 of the compressed-gas canister 1.

Figure 1:
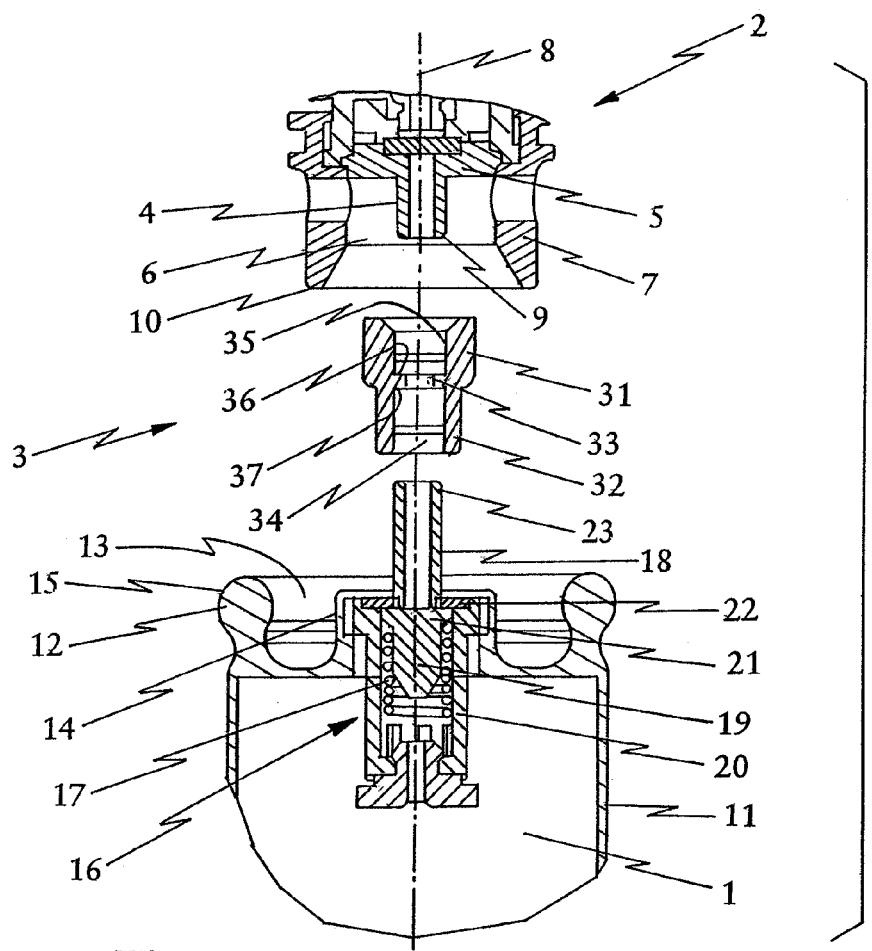
FIG. 1 is an exploded sectional view of a compressed-gas canister and of a gas inlet solenoid of a fastening appliance that runs on compressed gas.
Figure 2:
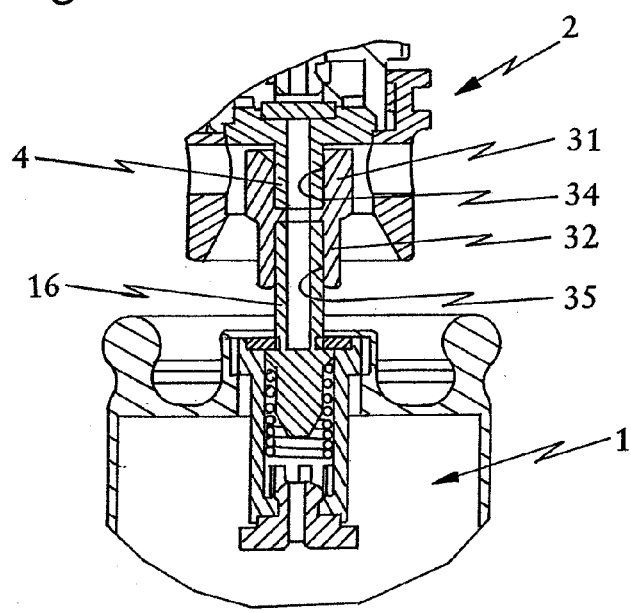
FIG. 2 is a sectional view of the canister and of the solenoid of FIG. 1 with their end-pieces inserted into the sealing connector.
Figure 3:
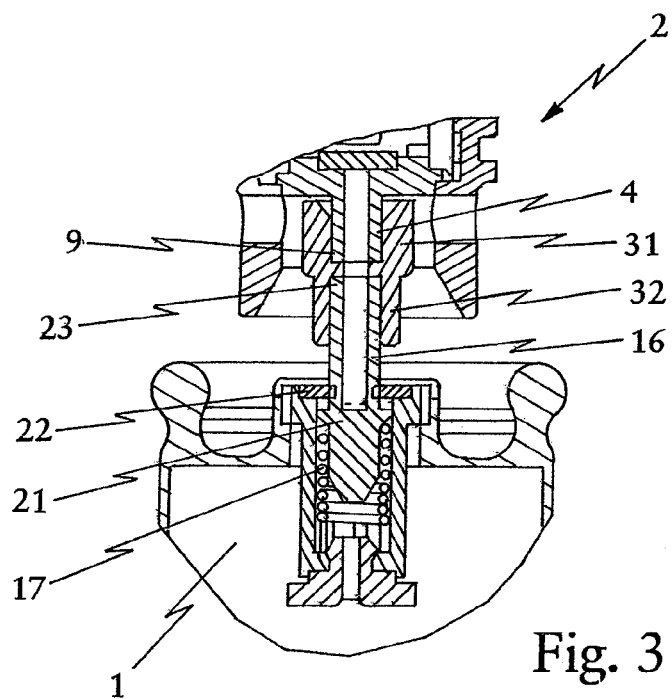
FIG. 3 is a view similar to that of FIG. 2, but in the state of transferring gas from the cartridge to the appliance.

The two interior walls 34, 35 of the two sleeves 31, 32 respectively constitute cylindrical sealing surface portions which, in operation (FIGS. 2, 3) extend on each side of the ends 9 and 23 of the two end-pieces 4 and 16 respectively.

More specifically, and still in operation, the ends 9 and 23 of the end-pieces 4 and 16 come into abutment against the two annular transverse walls 36, 37 of the radial partition 33 of the connector 3, opposite one another, which therefore run at right angles to the axis 8 of the cylindrical sealing surface portions 34, 35 and which thus constitute sealing surface portions. In operation, the partition 3 is interposed between the two end-pieces 4, 16.

Still in operation, by virtue of conventional means which have not been depicted, and with the inlet male 4 and ejection 16 end-pieces pushed into the double female connecting sleeve 31, 32, the male ejection end-piece 16 is pushed back by the male inlet end-piece 4 against the action of the return spring 17 to disengage the annular valve rim 21 from the seal 22 and allow the compressed gas to escape from the canister 1 into the solenoid 2 of the fastening appliance.

In an advantageous embodiment of the connector of the invention, there is an annular and traverse seal intended to be housed in two grooves 90 (FIG. 5*a*) 230 (FIG. 5*b*) formed in the end surfaces of the two male end pieces 4 and 16, respectively.

The invention claimed is:

1. A connection arrangement for transferring gas from a compressed gas cartridge, comprising:
   a valve element which is configured to control the release of gas from the gas cartridge;
   a male outlet which is integral with the valve element;
   a male inlet of a gas receiver for a tool that runs on compressed gas; and
   a connector receiving and connecting said male inlet and outlet;
   each of said male outlet and inlet including a side surface extending in an axial direction of said male outlet or inlet, and an end face extending transversely of said axial direction and having an opening for the compressed gas;
   said connector comprising a tubular housing having a through hole extending from one end to an opposite end of said housing, an inner wall of said housing contacting the side surfaces of said male outlet and inlet in a sealing manner;
   said connector further comprising, in a middle region of said through hole, transverse sealing surfaces that extend transversely of said axial direction and contact the end faces of said male outlet and inlet in a sealing manner;
   wherein a diameter of said through hole in the middle region is the same as inner diameters of the openings formed in the end faces of said male inlet and outlet.

2. The connection according to claim 1, wherein the valve element is configured to be biased toward a closed position by a spring and configured to be driven against the bias of the spring by a force transmitted via the connector from the male inlet of a gas receiver, toward an open position wherein gas can be released from the compressed gas cartridge.

3. A connection, comprising:
   a spring biased compressed gas flow control valve element which is configured to control the release of compressed gas from a compressed gas cartridge;
   a male outlet which is integral with the compressed gas flow control valve element;
   a male inlet of a gas receiver for a tool that runs on compressed gas; and
   a connector receiving and connecting said male inlet and outlet;
   each of said male outlet and inlet including a side surface extending in an axial direction of said male outlet or inlet, and an end face extending transversely of said axial direction and having an opening for the compressed gas;
   said connector comprising a tubular housing having a through hole extending from one end to an opposite end of said housing, an inner wall of said housing contacting the side surfaces of said male outlet and inlet in a sealing manner;
   said connector further comprising, in a middle region of said through hole, transverse sealing surfaces that extend transversely of said axial direction and contact the end faces of said male outlet and inlet in a sealing manner;
   wherein an entirety of said connector is positioned outside the opening of said male outlet.

4. The connection according to claim 3, wherein said connector further comprises an annular and transverse seal housed in two grooves formed in the end faces of the male inlet and outlet, respectively.

5. The connection according to claim 3, wherein the tubular housing comprises a double female sleeve for accommodating the male inlet and outlet, and an annular and transverse sealing partition providing said transverse sealing surfaces, said transverse sealing partition being interposed between the male inlet and outlet.

6. The connection according to claim 3, wherein a diameter of said through hole in the middle region is the same as diameters of the openings formed in the end faces of said male inlet and outlet.

7. The connection according to claim 3, wherein said housing is H-shaped in cross section.

8. The connection according to claim 3, wherein at least one of said male inlet and outlet is removably received in the housing of said connector with the inner wall of said housing contacting the side surfaces of said at least one of said male outlet and inlet in a sealing manner.

9. The connection according to claim 3, wherein the inner wall of said housing contacts the side surfaces of said male outlet and inlet along a substantial part of an axial extent of said housing.

10. The connection according to claim 3, wherein the inner wall of said housing and the side surfaces of said male outlet and inlet which contact each other in a sealing manner are cylindrical surfaces.

11. The connection according to claim 3, wherein said connector consists of said tubular housing.

12. The connection according to claim 3, wherein a diameter of said through hole in the middle region is the same as an inner diameter of the opening formed in the end face of said male inlet.

13. The connection according to claim 3, wherein said housing comprises therein a transverse wall having opposite surfaces that define the transverse sealing surfaces,
   said transverse wall being flat and free of projections projecting toward either end of said housing.

14. The connection according to claim 13, wherein said housing comprises therein a transverse wall having opposite surfaces that define the transverse sealing surfaces;
   said transverse sealing surfaces being directly contiguous to an axially extending inner surface of said through hole in said transverse wall.

15. The connection according to claim 13, wherein said housing comprises therein a transverse wall having opposite surfaces that define the transverse sealing surfaces; said transverse wall diving said through hole of said housing into an inlet section and an outlet section which receive and contact the male outlet and male inlet in a sealing manner, respectively, wherein an inner diameter of the through hole in said inlet section is substantially same as in said outlet section.

16. The connection according to claim 3, wherein said housing comprises therein a transverse wall having opposite surfaces that define the transverse sealing surfaces; said transverse wall diving said through hole of said housing into an inlet section and an outlet section which receive and contact the male outlet and male inlet in a sealing manner, respectively, wherein an inner diameter of the through hole in said inlet section is substantially same as in said outlet section.

17. The connection according to claim 3, wherein said housing comprises therein a transverse wall having opposite surfaces that define the transverse sealing surfaces; said transverse sealing surfaces being directly contiguous to an axially extending inner surface of said through hole in said transverse wall.

18. The connection according to claim 3, wherein the spring biased compressed gas flow control valve element is configured to be biased toward a closed position by a spring and configured to be driven against the bias of the spring by a force transmitted via the connector from the male inlet of a gas receiver, toward an open position wherein gas can be released from the compressed gas cartridge.

19. A connection, comprising:
   a spring biased compressed gas flow control valve element which is configured to control the release of compressed gas from a compressed gas cartridge;
   a male outlet which is integral with the compressed gas flow control valve element;
   a solenoid operated gas receiver configured to supply gas to a compressed gas operated tool, the solenoid operated gas receiver having a solenoid;
   a male inlet of the gas receiver which is operatively connected with the solenoid; and
   a connector receiving and connecting said male inlet and outlet;
   each of said male outlet and inlet including a side surface extending in an axial direction of said male outlet or inlet, and an end face extending transversely of said axial direction and having an opening for the compressed gas;
   said connector comprising a tubular housing having a through hole extending from one end to an opposite end of said housing, an inner wall of said housing contacting the side surfaces of said male outlet and inlet in a sealing manner;
   said connector further comprising, in a middle region of said through hole, transverse sealing surfaces that extend transversely of said axial direction and contact the end faces of said male outlet and inlet in a sealing manner;
   wherein said housing comprises therein a transverse wall having opposite surfaces that define the transverse sealing surfaces, an entirety of said transverse wall being flat and free of projections projecting toward either end of said housing.

20. The connection according to claim 19, wherein said housing comprises therein a transverse wall having opposite surfaces that define the transverse sealing surfaces; said transverse sealing surfaces being directly contiguous to an axially extending inner surface of said through hole in said transverse wall.

21. The connection according to claim 20, wherein said housing comprises therein a transverse wall having opposite surfaces that define the transverse sealing surfaces; said transverse wall diving said through hole of said housing into an inlet section and an outlet section which receive and contact the male outlet and male inlet in a sealing manner, respectively, wherein an inner diameter of the through hole in said inlet section is substantially same as in said outlet section.

22. The connection according to claim 21, wherein a diameter of said through hole in the middle region is the same as inner diameters of the openings formed in the end faces of said male inlet and outlet.

23. The connection according to claim 19, wherein the spring biased compressed gas flow control valve element is configured to be biased toward a closed position by a spring and configured to be driven against the bias of the spring by a force transmitted via the connector from the male inlet of a gas receiver, toward an open position wherein gas can be released from the compressed gas cartridge.

* * * * *